United States Patent
Zhang et al.

(10) Patent No.: US 9,310,921 B2
(45) Date of Patent: Apr. 12, 2016

(54) SCREEN CONTROL METHOD AND THE APPARATUS

(71) Applicant: TENCENT TECHNOLOGY (SHENZHEN) COMPANY LIMITED, Shenzhen (CN)

(72) Inventors: Kai Zhang, Shenzhen (CN); Bo Hu, Shenzhen (CN); Tingyong Tang, Shenzhen (CN); Renfang Liu, Shenzhen (CN); Zhipei Wang, Shenzhen (CN); Ruiyi Zhou, Shenzhen (CN); Xi Wang, Shenzhen (CN); Zhengkai Xie, Shenzhen (CN); Bosen He, Shenzhen (CN); Ying Huang, Shenzhen (CN); Wei Li, Shenzhen (CN); Cheng Feng, Shenzhen (CN); Huijiao Yang, Shenzhen (CN); Yulei Liu, Shenzhen (CN); Sha Mo, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 28 days.

(21) Appl. No.: 14/286,059

(22) Filed: May 23, 2014

(65) Prior Publication Data
US 2014/0285456 A1 Sep. 25, 2014

Related U.S. Application Data

(63) Continuation of application No. PCT/CN2013/087576, filed on Nov. 21, 2013.

(30) Foreign Application Priority Data

Mar. 22, 2013 (CN) .......................... 2013 1 0096548

(51) Int. Cl.
G06F 3/045 (2006.01)
G06F 3/041 (2006.01)
G06F 3/044 (2006.01)
G06F 3/0488 (2013.01)

(52) U.S. Cl.
CPC .............. *G06F 3/0414* (2013.01); *G06F 3/044* (2013.01); *G06F 3/045* (2013.01); *G06F 3/0488* (2013.01); *G06F 2203/04105* (2013.01)

(58) Field of Classification Search
CPC ....... G06F 3/0414; G06F 3/041; G06F 3/044; G06F 3/045
USPC .................... 345/173–178; 178/18.01–18.09, 178/20.01–20.04
See application file for complete search history.

(56) References Cited

U.S. PATENT DOCUMENTS

| 8,436,806 B2 * | 5/2013 | Almalki et al. | ............... 345/104 |
| 2010/0088654 A1 * | 4/2010 | Henhoeffer | .................... 715/863 |
| 2011/0080350 A1 * | 4/2011 | Almalki et al. | ............... 345/173 |

(Continued)

FOREIGN PATENT DOCUMENTS

CN 101551723 A 7/2009

OTHER PUBLICATIONS

The World Intellectual Property Organization (WIPO) International Search Report for PCT/CN2013/087576 Jan. 30, 2014.

*Primary Examiner* — Vijay Shankar
(74) *Attorney, Agent, or Firm* — Anova Law Group, PLLC

(57) ABSTRACT

Screen control methods and apparatus are provided. When it is determined that a touch control pressure value on a touch control screen exceeds a pre-set pressure threshold value to, a touch control operation by a finger on the touch control screen can be obtained. Corresponding to the touch control operation, a control instruction can be called according to a mapping relationship table that is pre-set. The mapping relationship table includes a mapping relationship between the touch control operation and the control instruction. The touch control screen can be controlled to display contents according to the control instruction.

20 Claims, 7 Drawing Sheets

(56) References Cited

U.S. PATENT DOCUMENTS

| | | |
|---|---|---|
| 2012/0050158 A1 | 3/2012 | Ahn |
| 2013/0063364 A1 | 3/2013 | Moore |
| 2014/0354583 A1* | 12/2014 | Tokutake ...................... 345/174 |
| 2015/0077381 A1* | 3/2015 | Park et al. ...................... 345/174 |

* cited by examiner

SCREEN CONTROL METHOD AND THE APPARATUS

CROSS-REFERENCES TO RELATED APPLICATIONS

This application is a continuation application of PCT Patent Application No. PCT/CN2013/087576, filed on Nov. 21, 2013, which claims priority to Chinese Patent Application No. CN2013100965486, filed on Mar. 22, 2013, the entire contents of all of which are incorporated herein by reference.

FIELD OF THE DISCLOSURE

The disclosure relates to the application field of electronic devices and, more particularly, relates to screen control methods and apparatus.

BACKGROUND

Currently, electronic devices such as mobile phones and tablet computers may have a touch control screen. The user may trigger operations on the touch control screen by a finger. The touch control screen has become dominant on the market of liquid crystal screens due to its convenience and pleasant use experiences.

With improvement of screen manufacturing, the touch control screen of the electronic devices becomes bigger and bigger, e.g., including a 5- or 6-inch screen on a mobile phone. When using the electronic device having such big screen with a single finger, the user sometimes cannot reach/touch certain locations on the screen due to its big size. It is thus difficult to conveniently control the screen. For example, when the user wants to control the screen with his/her left finger, the left thumb often cannot reach the top right area on the screen and the user has to use his/her right hand to reach the top right area to close or minimize current window. This is very inconvenient for users to operate.

BRIEF SUMMARY OF THE DISCLOSURE

One aspect of the present disclosure includes a screen control method. The method can determine whether a touch control pressure value on a touch control screen exceeds a pre-set pressure threshold value to generate determined results. When the determined results include that the touch control pressure value exceeds the pre-set pressure threshold value, a touch control operation by a finger on the touch control screen can be obtained. A control instruction can be called corresponding to the touch control operation according to a mapping relationship table that is pre-set. The mapping relationship table includes a mapping relationship between the touch control operation and the control instruction. The touch control screen can be controlled to display contents according to the control instruction.

Another aspect of the present disclosure includes a screen control apparatus. The screen control apparatus can include a determining unit, an obtaining unit, a calling unit, and a processing unit. The determining unit can be configured to determine whether a touch control pressure value on a display unit exceeds a pre-set pressure threshold value and to generate determined results. The obtaining unit, configured to obtain a touch control operation by a finger on the display unit, when the determined results from the determining unit include that the touch control pressure value exceeds the pre-set pressure threshold value. The calling unit can be configured to call a control instruction corresponding to the touch control operation obtained by the obtaining unit, according to a mapping relationship table that is pre-set. The mapping relationship table includes a mapping relationship between the touch control operation and the control instruction. The processing unit can be configured to control the display unit to display contents, according to the control instruction called by the calling unit.

Another aspect of the present disclosure includes a non-transitory computer-readable medium having computer program. When being executed by a processor, the computer program performs a screen control method. The method comprises determining whether a touch control pressure value on a touch control screen exceeds a pre-set pressure threshold value and generating determined results, and obtaining a touch control operation by a finger on the touch control screen, when the determined results include that the touch control pressure value exceeds the pre-set pressure threshold value. The method also includes calling a control instruction corresponding to the touch control operation according to a mapping relationship table that is pre-set. The mapping relationship table includes a mapping relationship between the touch control operation and the control instruction. Further, the method includes controlling the touch control screen to display contents according to the control instruction.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

FIGS. 1-6 depict exemplary screen control methods and apparatus in accordance with various disclosed embodiments. The exemplary methods and apparatus can be implemented by any appropriate computing platform.

Figure 7:
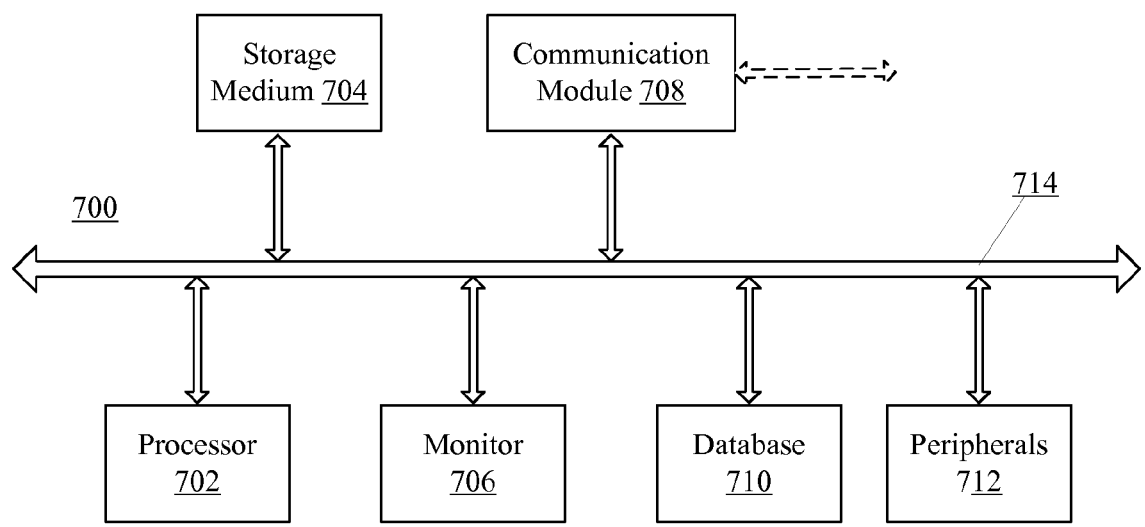
FIG. 7 depicts an exemplary computer system for an electronic device consistent with the disclosed embodiments.

FIG. 7 shows a block diagram of an exemplary computer system 700 capable of implementing the disclosed screen control methods and apparatus. As shown in FIG. 7, the exemplary computer system 700 may include a processor 702, a storage medium 704, a monitor 706, a communication module 708, a database 710, peripherals 712, and one or more bus 714 to couple the devices together. Certain devices may be omitted and other devices may be included.

The processor 702 can include any appropriate processor or processors. Further, the processor 702 can include multiple cores for multi-thread or parallel processing. The storage medium 704 may include memory modules, for example, ROM, RAM, and flash memory modules, and mass storages, for example, CD-ROM, U-disk, removable hard disk, etc. The storage medium 704 may store computer programs for implementing various processes, when executed by the processor 702.

Further, the peripherals 712 may include I/O devices, for example, keyboard and mouse, and the communication module 708 may include network devices for establishing connections through the communication network 602. The database 710 may include one or more databases for storing certain data and for performing certain operations on the stored data, for example, webpage browsing, database searching, etc.

The disclosed screen control apparatus can include the computer system as shown in FIG. 7. The disclosed screen control apparatus can include an electronic device or can be configured within an electronic device. The disclosed screen control apparatus and/or electronic device can include a display unit and/or a touch control screen. The disclosed screen control apparatus and/or electronic device can be a terminal device.

For example, the disclosed screen control apparatus can be or can be configured within a personal computer (PC), a work station computer, a server computer, a hand-held computing device (tablet), a smart phone or mobile phone, or any other user-side computing device. In various embodiments, the disclosed screen control apparatus can include a network access device. The disclosed screen control apparatus can be stationary or mobile.

Exemplary screen control methods can be used in applications of electronic devices, for example, to control the display contents on the touch control screen of the electronic devices.

When a finger, a stylus, or other suitable object touches the touch control screen, the touch screen system locates and verifies information inputted according to a pattern/icon or position touched by, e.g., the finger. The touching or control operation can be one or more of touch gestures including, but not limited to, sliding, dragging, long pressing, clicking (tapping), etc.

The touch control screen may often include a touch detection apparatus and a touch screen controller. The touch detection apparatus can be installed in front of the screen, and can be used to detect and receive the position information of the touching by the user and send the position information to the touch screen controller. The touch screen controller can receive the information sent from the touch detection apparatus, transform the information into coordinates of point(s), and send the coordinates of point(s) to, for example, a central processing unit (CPU). The touch screen controller can also receive commands from the CPU to display on the screen.

Figure 1:
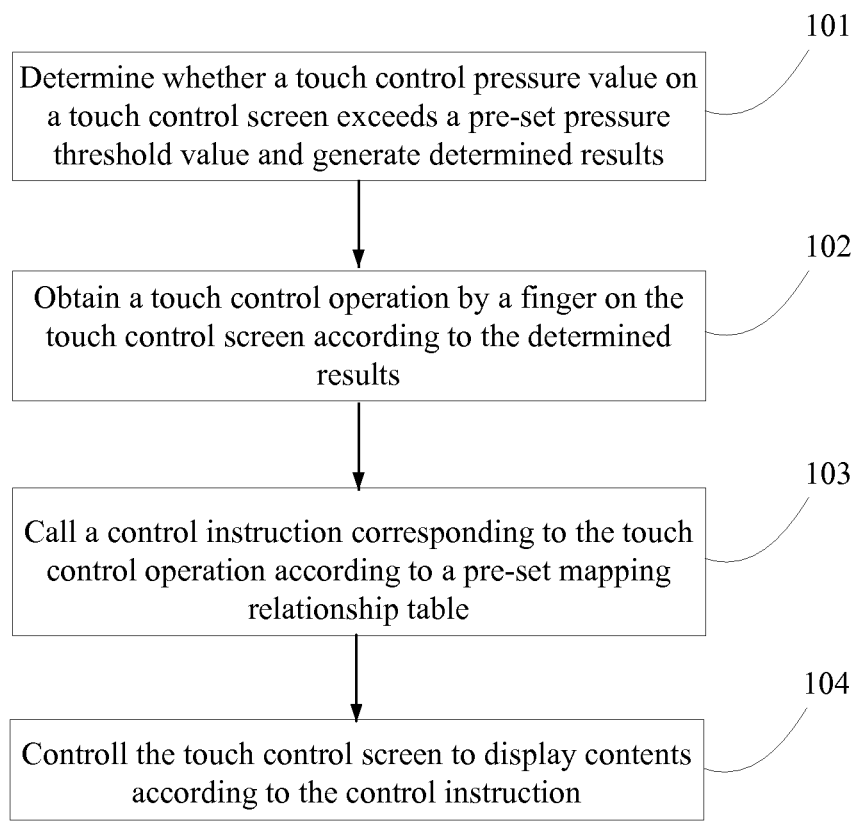
FIG. 1 depicts an exemplary screen control method consistent with the disclosed embodiments.

FIG. 1 depicts an exemplary screen control method in accordance with various disclosed embodiments.

In Step 101, it is determined whether a touch control pressure value on a touch control screen exceeds a pre-set pressure threshold value. The determined results can be generated.

The electronic device can use a pressure sensor to conduct a real-time monitor/detection of the touch control pressure value on the display unit. As disclosed, the display unit can have a touch control function. In practical application, the display unit can include a touch control screen. Although the touch control screen is primarily described as a display unit in accordance with various embodiments, the display unit is not limited to the touch control screen and other suitable units that have touch control function can be included herein.

When a touch control pressure value is monitored, the electronic device can determine whether the touch control pressure value on the touch control screen exceeds a pre-set pressure threshold value and can then provide the determined results. The pre-set pressure threshold value can be used as determination criteria for a start instruction of screen control (or a screen control start instruction). The pre-set pressure threshold value can be set by manufacturer of the electronic device or by the user. For example, the pre-set pressure threshold value can be set about 70% of a peak pressure value. The peak pressure value can be a maximum pressure value that the pressure sensor can measure.

In one embodiment, the pressure sensor can be configured on the upward or downward side of the touch control screen, and can have a size the same as the touch control screen. Multiple pressure sensors can be configured, e.g., according to a pre-set distance interval having the same distance between adjacent pressure sensors. In various embodiments, the relative position between the pressure sensor and the touch control screen is not limited. Any desired relative position there-between can be encompassed.

In addition, instead of using the pressure sensor, the electronic device can use a resistance-type touch control screen to obtain a start instruction of screen control. When using the resistance-type touch control screen, the electronic device can obtain a bias voltage generated from a screen pressed by the user's finger. The obtained bias voltage can be used as the start instruction of screen control.

In Step 102, a touch control operation by a finger (or any object, e.g., on hand) on the touch control screen is obtained, when the determined results include that the touch control pressure value exceeds the pre-set pressure threshold value.

When the touch control pressure value on the touch control screen exceeds the pre-set pressure threshold value, the electronic device can start a screen control mode, to obtain the touch control operation by the finger on the touch control screen. The touch control operation can be a slide operation, a long-press operation, a click operation, and/or combinations thereof.

Note that, the touch control operation by the finger on the touch control screen is obtained by the electronic device through the touch control screen, not by the electronic device through the pressure sensor. The touch control pressure value obtained from the pressure sensor by the electronic device can only be used as the start instruction of the screen control. For the electronic device with the capacitance-type touch control screen, the user can press to generate the capacitance-type touch control pressure value and then release, with the finger still on the touch control screen, to conduct the touch control operation. For example, when conducting a slide operation, the user does not need to press (to provide a pressure) the touch control screen all the time during the slid operation. Such touch control operation can be conducted more easily and accurately.

In Step 103, a control instruction corresponding to the touch control operation is called, according to a mapping relationship table that is pre-set.

After the electronic device obtains the touch control operation by the finger on the touch control screen, the control instruction of the touch control operation can be called according to the pre-set mapping relationship table. The mapping relationship table can characterize a mapping relationship between the touch control operation and the control instruction. The mapping relationship table can be configured by the electronic device manufacturer or the user. The mapping relationship table can be configured to include contents including a touch control operation method and the control instruction corresponding to the touch control operation.

For example, Table 1 shows an exemplary mapping relationship table.

TABLE 1

| Touch Control Operation | Control Instruction |
|---|---|
| Draw circle | Refresh page |
| Draw line | Select |
| Long-Press | Capture a screen |
| Click | Delete |

The above table 1 is illustrated only for example, the mapping relationship table can include any suitable relationship between the touch control operation and the control instruction without limitation.

In Step 104, the touch control screen is controlled to display contents according to the control instruction.

After the electronic device obtains the control instruction according to the pre-set mapping relationship table, the electronic device can control the display contents on the touch control screen according to the control instruction. For example, to select an image displayed on some areas of the touch control screen, the user may operate and control the electronic device with a single hand. If the user is not able to touch an image displayed on the top left corner area of the touch control screen, the user can press the bottom on a right corner area of the touch control screen to trigger the control instruction to select the image displayed on the top left corner area of the touch control screen. In this manner, without touching the top-left corner area on the touch control screen, the contents displayed on the top-left corner area can be controlled.

As disclosed, the exemplary screen control method can include determining whether a touch control pressure value on a touch control screen exceeds a pre-set pressure threshold value and generating determined results; obtaining a touch control operation by a finger on the touch control screen, when the determined results include that the touch control pressure value exceeds the pre-set pressure threshold value; calling a control instruction corresponding to the touch control operation according to a mapping relationship table that is pre-set, the mapping relationship table including a mapping relationship between the touch control operation and the control instruction; and controlling the touch control screen to display contents according to the control instruction.

Figure 2A:
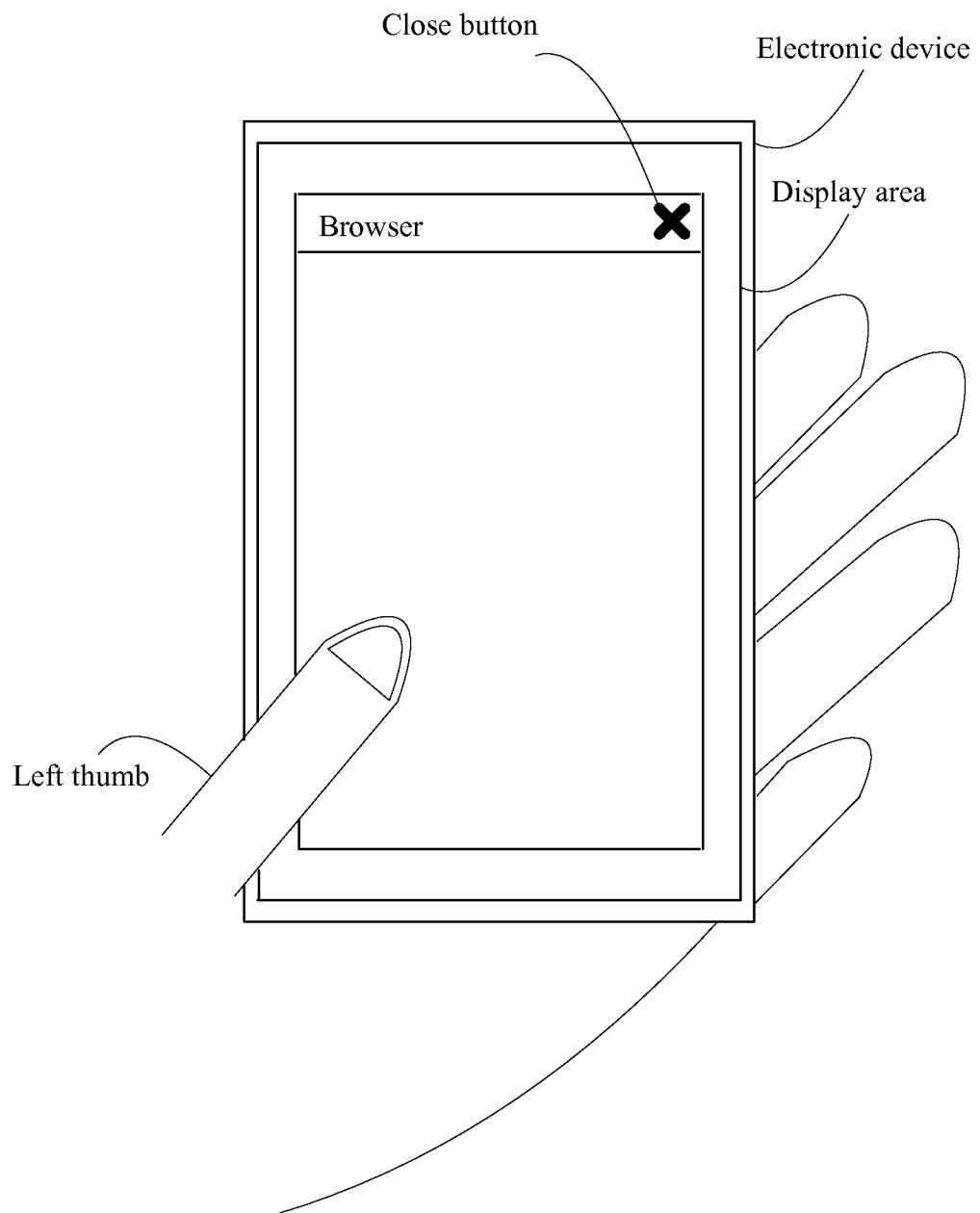
FIG. 2A is a schematic showing a conventional screen control.

Unlike conventional technologies that a user can only operate on a specific area on a screen, a user can operate on any finger touchable location on a screen to control the contents displayed on any untouchable location. The user can fully operate on a big size screen with the single hand. Specifically, in conventional technology, as shown in FIG. 2a, when a left thumb (or any left finger) of a user is unable to touch a close button of a browser located on the top right corner of the touch control screen, the user need to use his/her right hand to help conduct a click operation. It is thus very inconvenient to operate conventional electronic devices with a single hand.

Figure 2B:
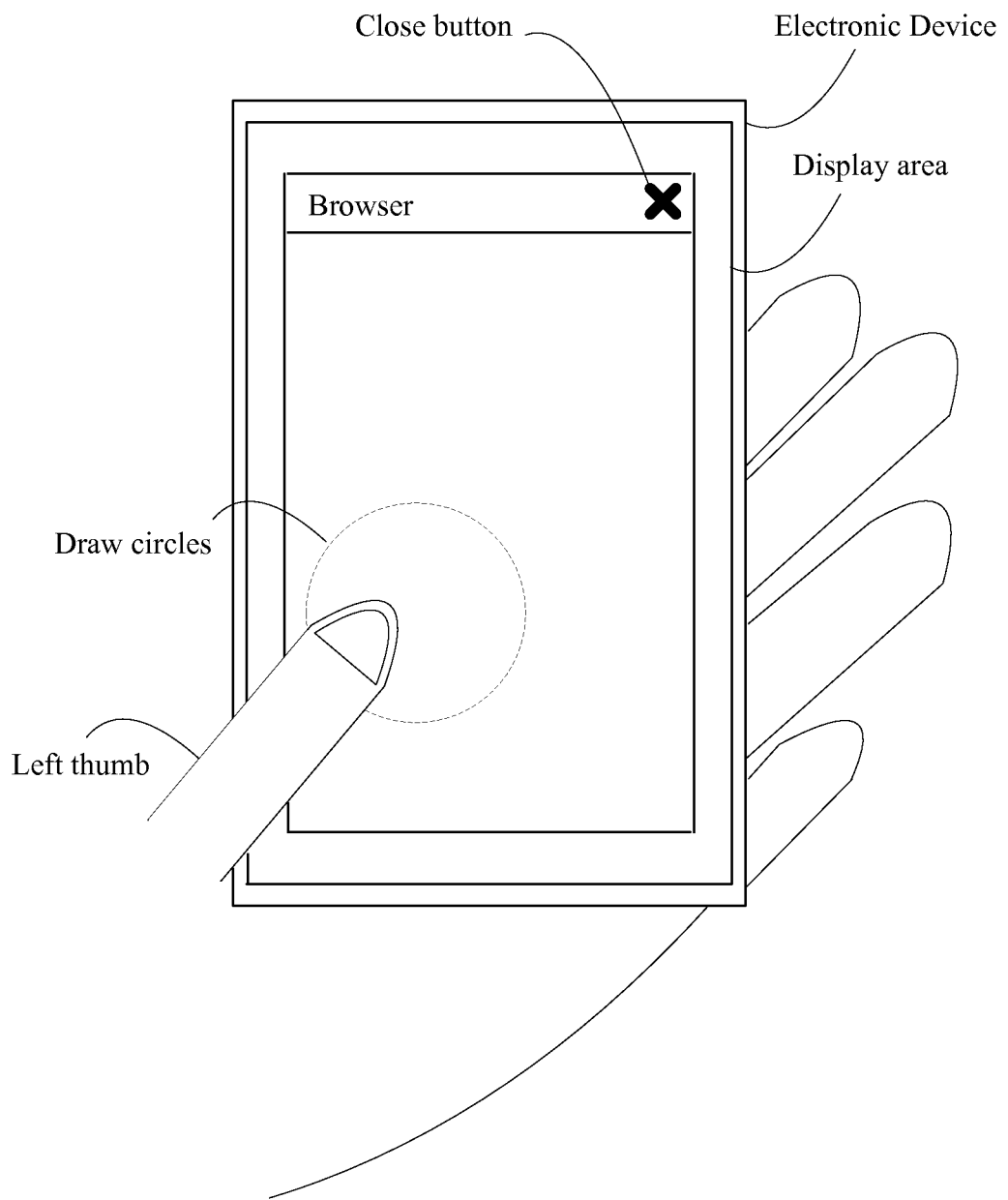
FIG. 2B depicts an exemplary screen control consistent with the disclosed embodiments.

Referring to the FIG. 2(b), as disclosed, when a left thumb of a user is unable to reach/touch a close button of a browser located on the top right corner of the touch control screen, the user can press on any finger touchable locations on the touch control screen and make circles to close the browser. Compared with the conventional technology, a user can use any finger touchable locations on the touch control screen to control the contents displayed on any finger untouchable locations on the touch control screen. In addition, for screen capturing, deleting, and/or other suitable operations involving menu options, the disclosed methods can avoid operations including: expanding the menu, selecting from the menu, and/or other menu-related operations to accomplish corresponding operations intuitionally and rapidly.

Figure 3:
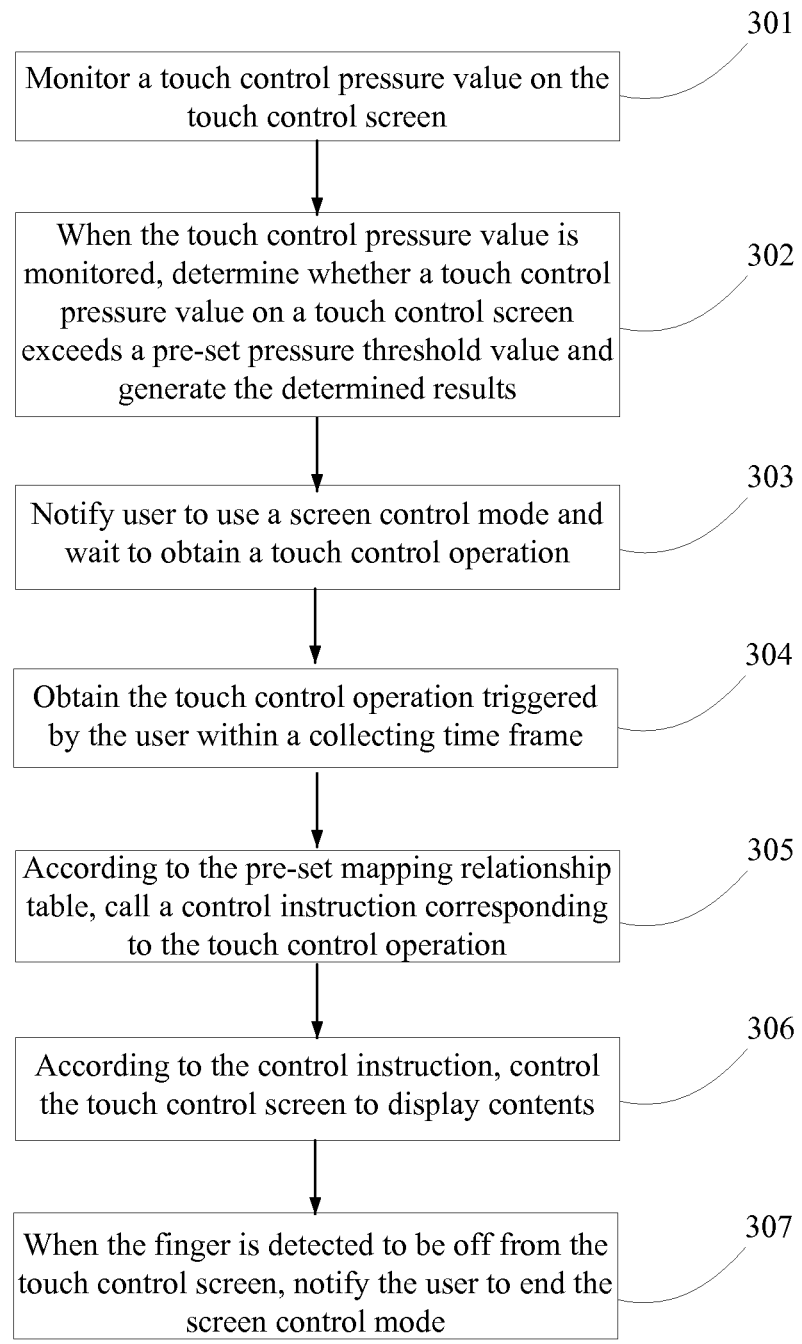
FIG. 3 depicts another exemplary screen control method consistent with the disclosed embodiments.

FIG. 3 depicts another exemplary touch control method in accordance with various disclosed embodiments. Compared with the method depicted in FIG. 1, the exemplary touch control method in FIG. 3 provides more details and is more expanded.

In Step 301, a touch control pressure value on a touch control screen is monitored.

The electronic device can use a pressure sensor to monitor the touch control pressure value on the touch control screen. The electronic device can monitor the touch control pressure value on the touch control screen for about 24 hours or any other suitable time length. The electronic device can monitor the touch control pressure value on the touch control screen within a selected time slot (e.g., from about 15:00 o'clock to about 20:00 o'clock) according to the user's request.

In Step 302, when the touch control pressure value is monitored, it is determined whether a touch control pressure value on a touch control screen exceeds a pre-set pressure threshold value and the determined results are generated.

In one embodiment, the electronic device can set a pressure threshold value, e.g., about 30% of the peak pressure. When the monitored touch control pressure value is less than 30% of the peak pressure, this monitored touch control pressure value can be ignored. When the monitored touch control pressure value is greater than 30% of the peak pressure, Step 303 can then be performed.

In Step 303, notifying the user to use a screen control mode, and waiting to obtain a touch control operation.

The electronic device can display a notification to use the screen control mode on a display area without covering the displayed contents. For example, the notification to use the screen control mode can be displayed on a page header and/or footer. In addition, the electronic device can display the notification using other methods, e.g., by providing translucence and/or reducing gray level of the entire display area. In one embodiment, to simplify human-computer interaction interface, the electronic device can notify the user via a speaker, e.g., by a notification sound; or can notify the user via a built-in actuator, e.g., by vibration.

In Step 304, the touch control operation triggered by the user within a collecting time frame is obtained.

The collecting time frame can include a time frame from a start point and an end point. The start point includes a start moment when the touch control pressure value, monitored by the electronic device, on the touch control screen exceeds the pre-set pressure threshold value. The end point includes an end moment when the finger is off from the touch control screen. The electronic device can obtain the touch control operation triggered by the user in the collecting time frame. In various embodiments, the electronic device can obtain the end point in various manners. For example, when the touch control screen is capacitance-type, the end point includes an end point that the monitored/detected capacitance on the touch control screen disappears. When the touch control screen is resistance-type, the end point includes an end point that the monitored/detected voltage on the touch control screen disappears.

Optionally, for an operation involving multiple steps, e.g., including copying and pasting, and to avoid repeated pressings on the touch control screen for each step and to further simplify operation steps of the screen control, the electronic device can obtain the user's multiple touch control operations within the collecting time frame, and then process the multiple touch control operations in an order of obtaining. For example, a two-second duration interval can be pre-set in the electronic device. From a start moment when the touch control pressure value on the touch control screen exceeds the pre-set pressure threshold value, the electronic device can firstly obtain a touch control operation. Once it is detected that the finger touches on the touch control screen for more than two seconds, the electronic device can continue to obtain another (or next) touch control operation until it is detected that the finger is off from the touch control screen.

In one embodiment, the touch control operations obtained by the electronic device can include at least one touch control operation selected from a slide operation, a long-press operation, and a click operation. For the slide operation, the electronic device can obtain a slide track of a finger on the touch control screen. For the long-press operation, the electronic device can obtain the time duration that the finger presses on the touch control screen and then can recognize the long-press operation by determining if the time duration of the pressing exceeds a pre-set triggering time duration. For the click operation, the electronic device can obtain a touch control pressure value of the clicking, and recognize the click operation by determining whether the touch control pressure value exceeds the pre-set pressure threshold value.

In Step 305, according to the pre-set mapping relationship table, a control instruction corresponding to the touch control operation is called. This step can be performed as described in Step 103 of FIG. 1.

Optionally, in the mapping relationship table, in addition to configuring the touch control operation mode and corresponding control instruction, the display area for the electronic device to obtain the touch control operation can be configured. Only when the user triggers the touch control operation in a corresponding display area, the electronic device can call the corresponding control instruction.

Figure 4:
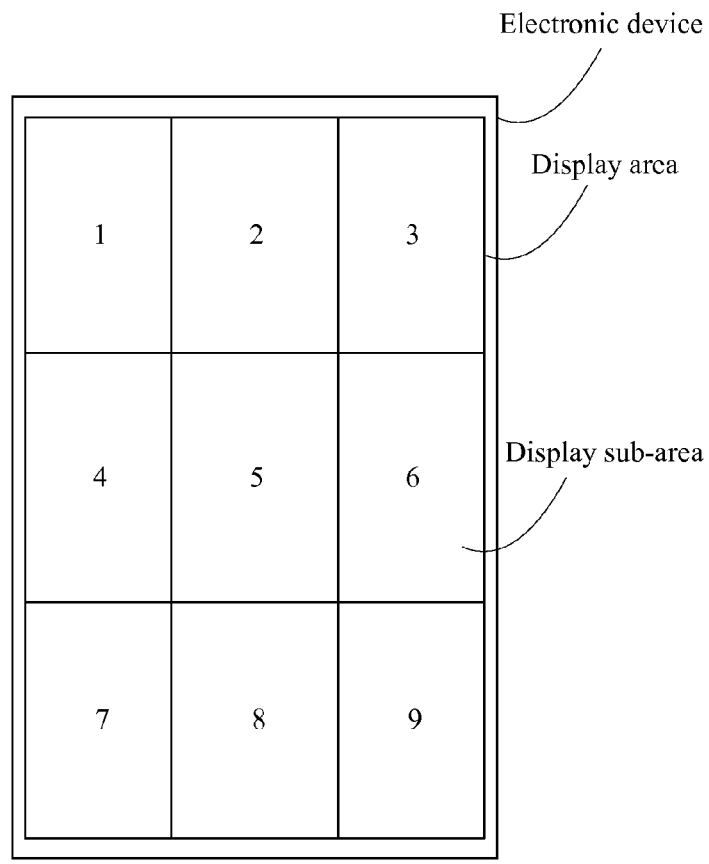
FIG. 4 is a schematic showing dividing of display sub-areas consistent with the disclosed embodiments.

For example, FIG. 4 is a schematic showing dividing of display sub-areas consistent with the disclosed embodiments. In one embodiment, the electronic device can divide the display area of the touch control screen into a nine-rectangle-grid, and can assign each display sub-area with a serial number, e.g., a digit from 1 to 9. The electronic device can add a configuration including the display sub-areas of the third dimensionality in the mapping relationship table. For example, the mapping relationship table can be illustrated as the following:

TABLE 2

| Touch Control Operation | Display Sub-Area | Control Instruction |
| --- | --- | --- |
| Draw Circle | 7 | Refresh page |
| Draw Circle | 6 | Capture screen |
| Draw line | 9 | Select |
| Click | 3 | Delete |

The configuration of the display area that the electronic device obtains the touch control operation can include an operational area provided to fit the use habit of the user. For example, for a left-handed user, the electronic device can set the display sub-area 7 in Table 1 as a display area to obtain the touch control operation, such that the left-handed user can operate with his/her left hand thumb. In addition, the two dimensional permutation and combination of the touch control operation and the display sub-area can map more control instructions without adding additional touch control operations. The user can use less touch control operations to have more controls on the displayed contents and thus to further simplify operations to control the screen.

In Step 306, according to the control instruction, the touch control screen is controlled to display contents. In one embodiment, the electronic device can control the touch control screen to operate on the displayed contents including at least one operation selected from starting, closing, maximizing, minimizing, refreshing, screen capturing, locking/unlocking, turning, selecting, editing, copying, pasting, deleting, and ignoring implementation.

In one embodiment, a control of ignoring implementation can include ignoring implementing of default operations of the electronic device. For example, an application of killing virus may always be running on the backstage, and virus samples can be downloaded from the cloud server every other 2-hours to update local virus database. When using the electronic device to download data, it is desirable to increase transmission speed of the downstream data. The user may touch to trigger a corresponding touch control operation on the touch control screen to ignore the obtaining of current virus samples.

In Step 307, when the finger is detected to be off from the touch control screen, the user is notified to end the screen control mode.

In a practical application, according to a touch control instruction generated due to the user's touch control operations, the electronic device can control the browser page displayed on the touch control screen. The user can press on the touch control screen to receive a notification from the speaker to enter a screen control mode. The user can draw circles on the touch control screen to refresh the current page. After stopping for about two seconds, the user can draw lines on the touch control screen to select all contents on the current page. After stopping for about two seconds, the user can draw a C-shaped pattern on the touch control screen to copy the selected contents and save in the cache of the electronic device.

In another practical application, where the electronic device can control the browser page displayed on the touch control screen according to a touch control instruction generated due to the user's touch control operations, the user can press on the touch control screen to receive a notification from the speaker to enter a screen control mode. The user can draw circles on the touch control screen to open the favorite. After stopping for about two seconds, the user can move his/her finger onto a certain website address and hold for 4 seconds, the browser can open the webpage corresponding to the website address. In addition, the user can draw lines to minimize the opened webpage.

In yet another practical application, where the electronic device can control image data displayed on the touch control screen according to the user's touch control operations, the user can press on the touch control screen to receive a notification from the speaker to enter a screen control mode. The user can draw a quarter of a circle clockwise on the touch control screen and rotate the drawing clockwise by an angle of 90°. After stopping for about two seconds, the user can draw three quarters of a circle anti-clockwise on the touch control screen and rotate the drawing anti-clockwise by an angle of 270°. After stopping for about two seconds, the user can long-press on the touch control screen for about four seconds and the electronic device can save the drawing after rotation.

Figure 5:
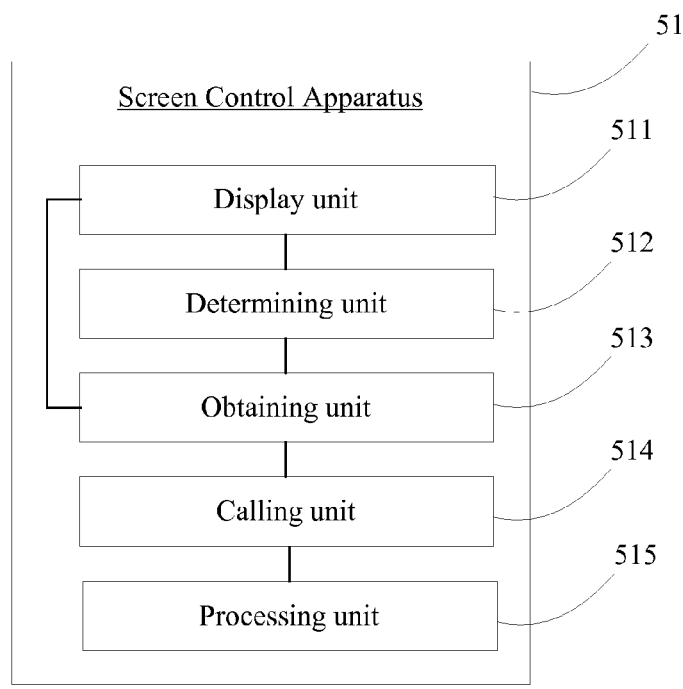
FIG. 5 depicts an exemplary screen control apparatus consistent with the disclosed embodiments.

Based on the methods depicted above, an exemplary screen control apparatus as shown in FIG. 5 is provided. The exemplary screen control apparatus can be included in an electronic device for implementing the disclosed methods. For example, the exemplary screen control apparatus shown in FIG. 5 can include a display unit 511, a determining unit 512, an obtaining unit 513, a calling unit 514, and/or a processing unit 515.

The display unit 511 is configured to provide a touch control function. In a practical application, the display unit can include a touch control screen.

The determining unit 512 is configured to determine whether a touch control pressure value on the display unit 511 exceeds a pre-set pressure threshold value and to generate determined results.

The obtaining unit 513 is configured to obtain a touch control operation by a finger on the display unit 511, when the determined results from the determining unit 512 include that the touch control pressure value exceeds the pre-set pressure threshold value.

The calling unit 514 is configured to call a control instruction corresponding to the touch control operation obtained by the obtaining unit 513, according to a mapping relationship table that is pre-set. The mapping relationship table includes a mapping relationship between the touch control operation and the control instruction.

The processing unit 515 is configured to control the display unit 511 to display contents, according to the control instruction called by the calling unit 514.

Further, the obtaining unit 513 is configured to obtain the touch control operation of the finger between a start point and an end point on the display unit 511. The start point includes a start moment when the touch control pressure value on the display unit 511 exceeds the pre-set pressure threshold value, and the end point includes an end moment when the finger is off the display unit 511.

Further, the obtaining unit 513 is configured to obtain at least two touch control operations on the display unit 511 between the start point and the end point based on a pre-set time length interval, wherein an interval between every two adjacent touch control operations includes one pre-set time length interval.

Figure 6:
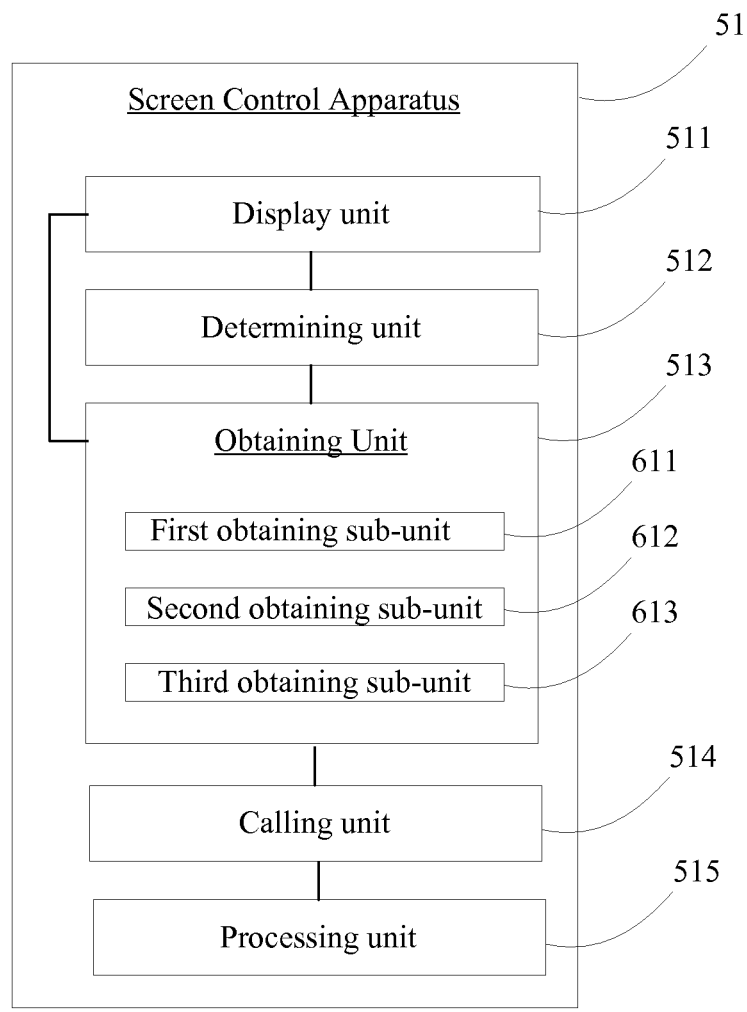
FIG. 6 depicts another exemplary screen control apparatus consistent with the disclosed embodiments.

Further, referring to FIG. 6, the obtaining unit 513 includes: a first obtaining sub-unit 611 configured to obtain a slide operation; a second obtaining sub-unit 612, configured to obtain a long-press operation; and/or a third obtaining sub-unit 611, configured to obtain a click operation.

The exemplary screen control apparatus 51 can be used to determine whether a touch control pressure value on a touch control screen exceeds a pre-set pressure threshold value to generate determined results. When the determined results include that the touch control pressure value exceeds the pre-set pressure threshold value, a touch control operation by a finger on the touch control screen can be obtained. A control instruction can be called corresponding to the touch control operation according to a mapping relationship table that is pre-set. The mapping relationship table includes a mapping relationship between the touch control operation and the control instruction. The touch control screen can be controlled to display contents according to the control instruction.

The touch control pressure value on the display unit 511 can be used as a start instruction to start the screen control of the display unit 511, according to a touch control operation of a user on any desired position on the display unit 511 to control contents displayed on the display unit 511. Unlike conventional technologies that a user can only operate and control on a particular or required area on a screen, a user can operate on any finger touchable location on a screen to control the contents displayed on any untouchable location. The user can thus fully operate on a big size screen with a single hand.

Various embodiments also provide a computer storage medium. The computer storage medium may store a program. Execution of the program includes some or all of the steps of the exemplary methods for implementing internet applications as disclosed herein.

The units included herein are described according to their functional logic, but are not limited to the above descriptions as long as the units can implement corresponding functions. Further, the specific name of each functional unit is used for distinguishing from on another without limiting the protection scope of the present disclosure. In various embodiments, the disclosed units can be configured in one apparatus or configured in multiple apparatus as desired. The units disclosed herein can be integrated in one unit or in multiple units. Each of the units disclosed herein can be divided into one or more sub-units, which can be recombined in any manner.

Note that suitable software and/or hardware (e.g., a universal hardware platform) may be included and used in the disclosed methods and systems. For example, the disclosed embodiments can be implemented by hardware only, which alternatively can be implemented by software products only. The software products can be stored in a computer-readable storage medium including, e.g., ROM/RAM, magnetic disk, optical disk, etc. The software products can include suitable commands to enable a terminal device (e.g., including a mobile phone, a personal computer, a server, or a network device, etc.) to implement the disclosed embodiments.

The term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a" does not exclude other elements included in the process, method, article, or apparatus having those elements.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items.

The embodiments disclosed herein are exemplary only. The order by which the foregoing examples of the present disclosure are presented merely reflects the convenience of description. It does not imply the preference among the examples. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Screen control methods and apparatus are provided. When it is determined that a touch control pressure value on a touch control screen exceeds a pre-set pressure threshold value to, a touch control operation by a finger on the touch control screen can be obtained. Corresponding to the touch control operation, a control instruction can be called according to a mapping relationship table that is pre-set. The mapping relationship table includes a mapping relationship between the touch control operation and the control instruction. The touch control screen can be controlled to display contents according to the control instruction.

The touch control pressure value on a display unit can be used as a start instruction to start the screen control of the display unit, according to a touch control operation of a user on any desired position on the display unit to control contents displayed on the display unit. Unlike conventional technologies that a user can only operate and control on a particular or required area on a screen, the disclosed methods and apparatus can allow a user to operate on any finger touchable location on a screen to control contents displayed on any untouchable location. The user can thus fully operate on a big size screen with a single hand.

What is claimed is:

1. A screen control method, comprising:
   dividing a display area of a touch control screen into a plurality of sub-areas;
   assigning each sub-area with a serial number;
   determining whether a touch control pressure value on a sub-area of the touch control screen exceeds a pre-set pressure threshold value and generating determined results;
   obtaining a touch control operation by a finger on the touch control screen, when the determined results comprise that the touch control pressure value exceeds the pre-set pressure threshold value;
   calling a control instruction corresponding to the touch control operation according to a mapping relationship table that is pre-set, wherein the mapping relationship table includes a mapping relationship among the touch control operation, the serial numbers of the sub-area that receives the touch control operation, and the control instruction; and
   controlling the touch control screen to display contents corresponding to the touch control operation and the serial number of the sub-area that receives the touch control operation according to the control instruction.

2. The method according to claim 1, wherein obtaining the touch control operation comprises:
   obtaining the touch control operation by the finger between a start point and an end point on the touch control screen, wherein the start point comprises a start moment when the touch control pressure value on the touch control screen exceeds the pre-set pressure threshold value, and the end point comprises an end moment when the finger is off from the touch control screen.

3. The method according to claim 2, wherein obtaining the touch control operation between the start point and the end point comprises:
   obtaining at least two touch control operations on the touch control screen between the start point and the end point based on a pre-set time length interval,
   wherein:
   an interval between every two adjacent touch control operations comprises one pre-set time length interval; and
   during the interval between every two adjacent touch control operations, the finger continues touching the touch control screen.

4. The method according to claim 3, wherein obtaining the touch control operation between the start point and the end point comprises:
   obtaining at least one touch control operation selected from a slide operation, a long-press operation, and a click operation.

5. The method according to claim 1, wherein controlling the touch control screen to display the contents comprises:
   according to the control instruction, controlling the touch control screen to operate on the contents using at least one operation selected from starting, closing, maximizing, minimizing, refreshing, screen capturing, locking/unlocking, turning, selecting, editing, copying, pasting, deleting, and ignoring implementation.

6. The method according to claim 5, wherein controlling the touch control screen to display the contents comprises:
   according to the control instruction, operating on a browser page displayed on the touch control screen with a corresponding operation selected from the at least one operation.

7. A screen control apparatus having a display unit, a display area of the display unit being divided into a plurality of sub-areas and each sub-area being assigned with a serial number, comprising:
   a determining unit, configured to determine whether a touch control pressure value on a sub-area of the display unit-exceeds a pre-set pressure threshold value and to generate determined results;
   an obtaining unit, configured to obtain a touch control operation by a finger on the display unit, when the determined results from the determining unit include that the touch control pressure value exceeds the pre-set pressure threshold value;

a calling unit, configured to call a control instruction corresponding to the touch control operation obtained by the obtaining unit, according to a mapping relationship table that is pre-set, wherein the mapping relationship table includes a mapping relationship among the touch control operation, the serial numbers of the sub-area that receives the touch control operation, and the control instruction; and a processing unit, configured to control the display unit to display contents corresponding to the touch control operation and the serial number of the sub-area that receives the touch control operation, according to the control instruction called by the calling unit.

8. The apparatus according to claim 7, wherein the obtaining unit is configured to obtain the touch control operation of the finger between a start point and an end point on the display unit, wherein the start point comprises a start moment when the touch control pressure value on the display unit exceeds the pre-set pressure threshold value, and the end point comprises an end moment when the finger is off from the display unit.

9. The apparatus according to claim 8, wherein the obtaining unit is configured to obtain at least two touch control operations on the display unit between the start point and the end point based on a pre-set time length interval, wherein:
an interval between every two adjacent touch control operations comprises one pre-set time length interval; and
during the interval between every two adjacent touch control operations, the finger continues touching the touch control screen.

10. The apparatus according to claim 9, wherein the obtaining unit comprises:
a first obtaining sub-unit, configured to obtain a slide operation;
a second obtaining sub-unit, configured to obtain a long-press operation; and
a third obtaining sub-unit, configured to obtain a click operation.

11. The apparatus according to claim 7, wherein the processing unit is configured, according to the control instruction, to control the touch control screen to operate on the contents using at least one operation selected from starting, closing, maximizing, minimizing, refreshing, screen capturing, locking/unlocking, turning, selecting, editing, copying, pasting, deleting, and ignoring implementation.

12. The apparatus according to claim 7, wherein the processing unit is configured, according to the control instruction, to operate on a browser page displayed on the touch control screen with a corresponding operation selected from the at least one operation.

13. A non-transitory computer-readable medium having computer program for, when being executed by a processor, performing a screen control method, the method comprising:
dividing a display area of a touch control screen into a plurality of sub-areas;
assigning each sub-area with a serial number;
determining whether a touch control pressure value on a sub-area of the touch control screen exceeds a pre-set pressure threshold value and generating determined results;
obtaining a touch control operation by a finger on the touch control screen, when the determined results include that the touch control pressure value exceeds the pre-set pressure threshold value;

calling a control instruction corresponding to the touch control operation according to a mapping relationship table that is pre-set, wherein the mapping relationship table includes a mapping relationship among the touch control operation, the serial numbers of the sub-area that receives the touch control operation, and the control instruction; and controlling the touch control screen to display contents according to the control instruction corresponding to the touch control operation and the serial number of the sub-area that receives the touch control operation.

14. The non-transitory computer-readable medium according to claim 13, wherein obtaining the touch control operation includes:
obtaining the touch control operation by the finger between a start point and an end point on the touch control screen,
wherein the start point includes a start moment when the touch control pressure value on the touch control screen exceeds the pre-set pressure threshold value, and the end point includes an end moment when the finger is off from the touch control screen.

15. The non-transitory computer-readable medium according to claim 14, wherein obtaining the touch control operation between the start point and the end point includes:
obtaining at least two touch control operations on the touch control screen between the start point and the end point based on a per-set time length interval,
wherein:
an interval between every two adjacent touch control operations includes one per-set time length interval; and
during the interval between every two adjacent touch control operations, the finger continues touching the touch control screen.

16. The non-transitory computer-readable medium according to claim 15, wherein obtaining the touch control operation between the start point and the end point includes:
obtaining at least one touch control operation selected from a slide operation, a long-press operation, and a click operation.

17. The non-transitory computer-readable medium according to claim 13, wherein controlling the touch control screen to display the contents includes:
according to the control instruction, controlling the touch control screen to operate on the contents using at least one operation selected from starting, closing, maximizing, minimizing, refreshing, screen capturing, locking/unlocking, turning, selecting, editing, copying, pasting, deleting, and ignoring implementation.

18. The non-transitory computer-readable medium according to claim 17, wherein controlling the touch control screen to display the contents includes:
according to the control instruction, operating on a browser page displayed on the touch control screen with a corresponding operation selected from the at least one operation.

19. The method according to claim 1, further comprises:
when it is determined that a touch control pressure value on a sub-area of the touch control screen exceeds a pre-set pressure threshold value, notifying a user to use a screen control mode, and waiting to obtain a touch control operation,
wherein notifying the user includes at least one of displaying a notification, playing a sound, and vibrating.

20. The method according to claim 3, wherein the at least two touch control operations comprise sequentially:

a first control operation corresponding to a first control instruction of selecting all contents on a current page and copying the selected contents; and a second control operation corresponding to a second control instruction of copying the selected content and saving in a cache.

\* \* \* \* \*